(12) United States Patent
Paviotti

(10) Patent No.: US 11,420,302 B2
(45) Date of Patent: Aug. 23, 2022

(54) CLEANING TURBINE

(71) Applicant: Metal World S.p.A., Pavia di Udine (IT)

(72) Inventor: Franco Paviotti, Trivignano Udinese (IT)

(73) Assignee: Metal World S.p.A., Pavia di Udine (IT)

( * ) Notice: Subject to any disclaimer, the term of this patent is extended or adjusted under 35 U.S.C. 154(b) by 858 days.

(21) Appl. No.: 16/300,938

(22) PCT Filed: May 12, 2017

(86) PCT No.: PCT/EP2017/061468
§ 371 (c)(1),
(2) Date: Nov. 12, 2018

(87) PCT Pub. No.: WO2017/194740
PCT Pub. Date: Nov. 16, 2017

(65) Prior Publication Data
US 2019/0291227 A1  Sep. 26, 2019

(30) Foreign Application Priority Data

May 12, 2016 (IT) .......................... 102016000049092

(51) Int. Cl.
*B23Q 11/00* (2006.01)
*F04D 23/00* (2006.01)
(Continued)

(52) U.S. Cl.
CPC ........ *B23Q 11/0046* (2013.01); *F04D 23/003* (2013.01); *F04D 23/005* (2013.01);
(Continued)

(58) Field of Classification Search
CPC ..... A47L 5/22; A47L 7/0095; B23B 2270/30; B23B 2270/62; B23C 2230/00–08;
(Continued)

(56) References Cited

U.S. PATENT DOCUMENTS 5,017,060 A * 5/1991 Shiratori ............... B23C 5/2269
407/1
6,595,727 B2 * 7/2003 Arvidsson ............. B23C 5/006
407/35
(Continued)

FOREIGN PATENT DOCUMENTS

DE  197 11 938 A1  9/1998
EP  2 644 318 A1   2/2013
(Continued)

OTHER PUBLICATIONS

International Search Report and Written Opinion from corresponding International Application No. PCT/EP2017/061468 dated Jul. 31, 2017; (7 pp).

*Primary Examiner* — Michael Lebentritt
*Assistant Examiner* — Julian B Getachew
(74) *Attorney, Agent, or Firm* — Calderone Bullock LLC

(57) ABSTRACT

Cleaning turbine having a cylindrical shape with an axis or rotation and provided with a concave base surface facing toward the work zone, with an upper surface, opposite the base surface, and a circumferential surface interposed between the base surface and the upper surface. The cleaning turbine is provided circumferentially with a plurality of slits angularly distanced from each other, facing upward and passing through the base surface and the upper surface. The cleaning turbine is also provided with a plurality of lateral apertures each of which extends radially from the slits to the circumferential surface.

23 Claims, 3 Drawing Sheets

(51) Int. Cl.
  *F04D 29/28* (2006.01)
  *F04D 29/38* (2006.01)
  *F04D 29/32* (2006.01)
  *A47L 5/22* (2006.01)
  *A47L 7/00* (2006.01)

(52) U.S. Cl.
  CPC ........... *F04D 29/28* (2013.01); *F04D 29/326* (2013.01); *F04D 29/384* (2013.01); *A47L 5/22* (2013.01); *A47L 7/0095* (2013.01)

(58) Field of Classification Search
  CPC ............ B23Q 11/0042; B23Q 11/0046; B23Q 11/005; B23Q 11/006; F04D 23/003; F04D 23/005; F04D 29/28; F04D 29/384; Y10T 409/304088
  See application file for complete search history.

(56) References Cited

U.S. PATENT DOCUMENTS

| | | | | |
|---|---|---|---|---|
| 8,622,661 B2 * | 1/2014 | Inamasu | ................... | B23C 5/10 407/11 |
| 9,004,822 B2 * | 4/2015 | Francis | ................... | B23C 5/06 407/33 |
| 9,308,611 B2 * | 4/2016 | Hideta | ................... | B23C 5/16 |
| 9,937,598 B2 * | 4/2018 | Oode | ................ | B23Q 11/0046 |

FOREIGN PATENT DOCUMENTS

| | | |
|---|---|---|
| JP | 2006-015444 A | 1/2006 |
| JP | 2013-091116 A | 5/2013 |

* cited by examiner

CLEANING TURBINE

BACKGROUND OF THE INVENTION

Field of the Invention

The present invention concerns a cleaning turbine used in the field of mechanical workings for removing chip or powders generated by the removal of material.

The cleaning turbine according to the present invention can be applied to a tool carrier or to a tool, such as a milling cutter, a drill bit, a molding machine bit, etc., used for making holes, hollows, blanks, grooves, patterns and so on.

In particular, the present invention is particularly indicated, although not exclusively, for working wood, chip, ennobled chip, MDF, Corian, plaster, oriented strand board (OSB), carbon fiber, high pressure laminate (HPL), plastics in general, glass fiber, fiberglass, composite materials.

Description of Related Art

In the field of machine tools for removing chip, cleaning turbines are known, for removing work residues from the work zone.

In particular, such cleaning turbines generate streams of air, under pressure or depression, to move or suck up the work residues, leaving the work zone and the tool totally visible. This prevents the work residues from making it impossible for the operator to see the work carried out, and from clogging the cavities and/or grooves made, thus compromising the accuracy of the final sizes of the cavity and/or groove made.

Such cleaning turbines can be installed coaxially to the work tool and are made to rotate solidly therewith.

The cleaning turbines may or may not provide cavities or bells located either in the lower part or the upper part of the turbines.

These cleaning turbines usually operate in association with suction devices provided to suck up the work residues distanced from the work zone by the cleaning turbine.

One disadvantage of known cleaning turbines is that, although they move the chip and powders, they are unable to clean effectively the zone affected by the working and therefore leave on the product being worked a large quantity of work residues that then have to be removed by the operators.

BRIEF SUMMARY OF THE INVENTION

One purpose of the present invention is therefore to improve the cleaning turbines used in association with work tools, to increase the efficiency of removing the work residues.

Another purpose of the present invention is to obtain a cleaning turbine which is less noisy compared with known cleaning turbines.

Another purpose is to obtain a cleaning turbine which is efficient with every type of tool and/or material to be worked.

Another purpose of the present invention is to obtain a cleaning turbine which lasts longer than known cleaning turbines.

The Applicant has devised, tested and embodied the present invention to overcome the shortcomings of the state of the art and to obtain these and other purposes and advantages.

The present invention is set forth and characterized in the independent claim, while the dependent claims describe other characteristics of the invention or variants to the main inventive idea.

In accordance with the above purposes, a perfected cleaning turbine according to the present invention, has an axial-symmetrical shape and is provided with a base surface, facing toward the work zone during use, an upper surface opposite the base surface, and a circumferential surface interposed between the base surface and the upper surface.

The cleaning turbine is also provided circumferentially with a plurality of slits angularly distanced from each other, and made in through manner through the base surface and the upper surface.

According to one aspect of the present invention, the cleaning turbine is also provided with a plurality of lateral apertures each of which extends radially through from the circumferential surface into one of the slits.

The lateral apertures are able to increase the suction flow of the work residues through the slits and therefore increase the suction capacity of the cleaning turbine.

By making the cleaning turbine according to the present invention rotate, a flow of air is generated that, by depression, sucks the work residues from the work zone through the slits.

The bigger work residues, that is, the chip, are expelled from the slits through the upper surface of the cleaning turbine.

The finer work residues, that is, the powders, are expelled through the lateral apertures by the centrifugal effect conferred by the rotation of the turbine.

Embodiments of the present invention can provide that the base surface of the turbine has a concave or bell conformation. This conformation allows to generate a very effective bell of depressed air toward the work zone, able to suck up the work residues even if the turbine is distanced from the work zone. Moreover, the bell conformation allows to increase the flow of air able to be sucked up through the slits.

BRIEF DESCRIPTION OF THE SEVERAL VIEWS OF THE DRAWING

These and other characteristics of the present invention will become apparent from the following description of some embodiments, given as a non-restrictive example with reference to the attached drawings wherein.

DETAILED DESCRIPTION OF THE INVENTION

Figure 1:
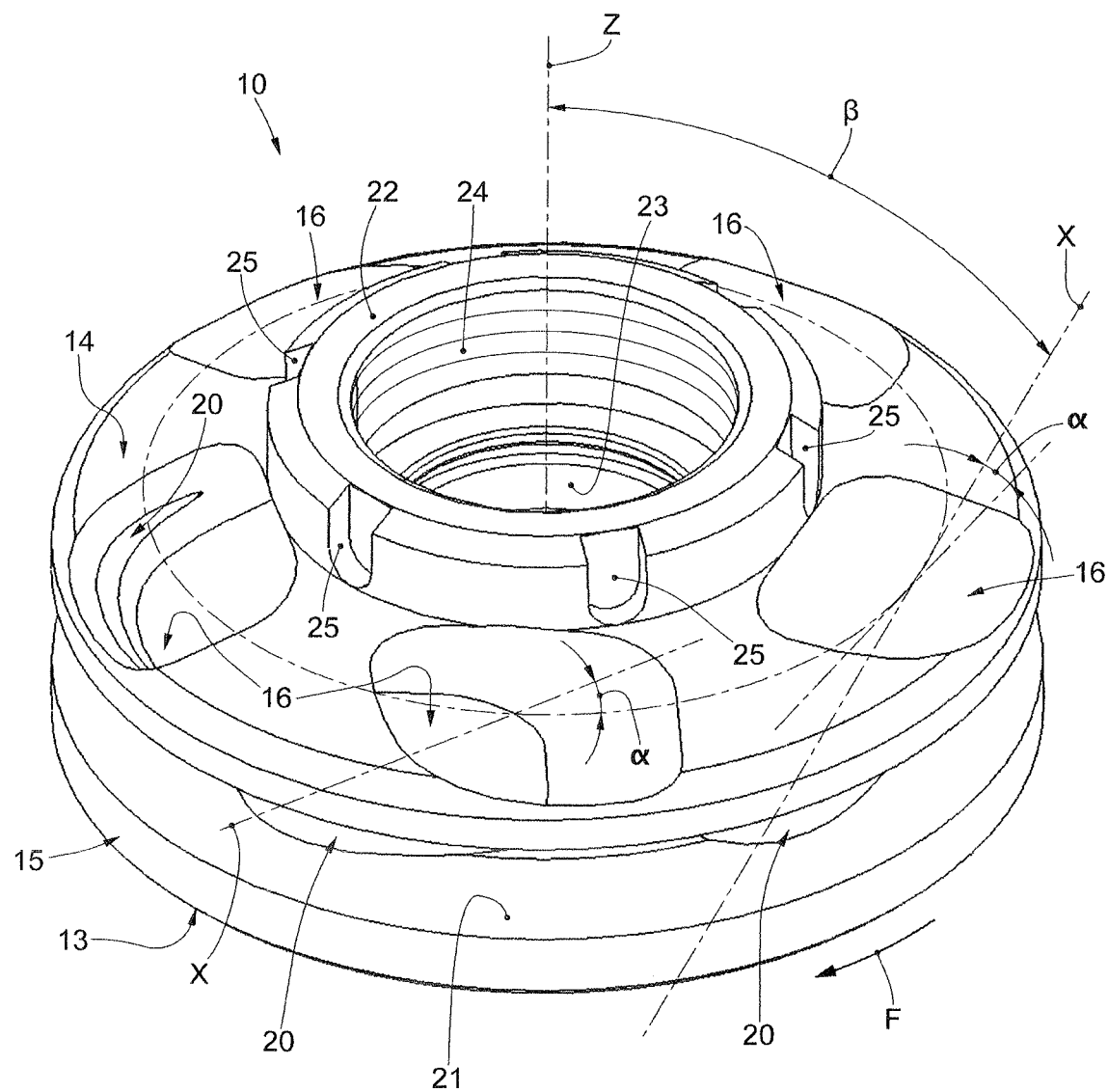
FIG. 1 is a perspective view of a cleaning turbine in accordance with the present invention.
Figure 2:
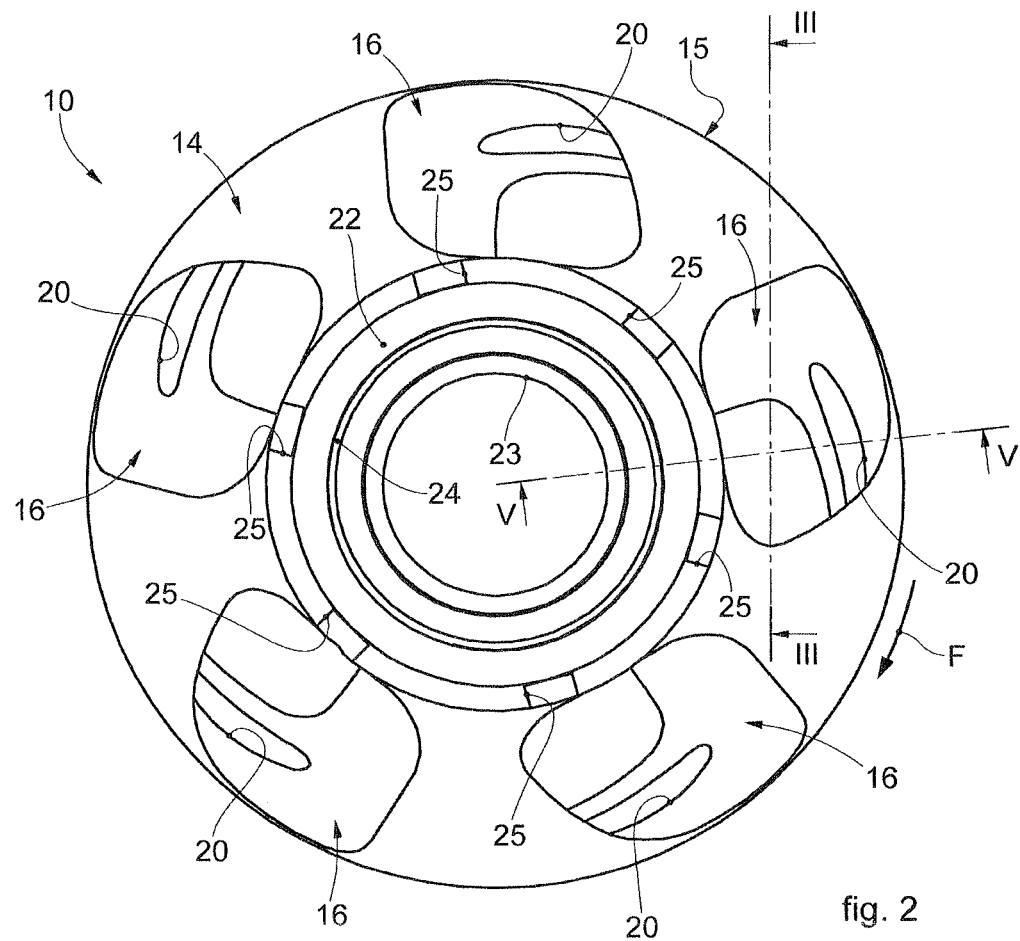
FIG. 2 is a plan view of a cleaning turbine in accordance with embodiments described here.

To facilitate comprehension, the same reference numbers have been used, where possible, to identify identical common elements in the drawings. It is understood that elements and characteristics of one embodiment can conveniently be incorporated into other embodiments without further clarifications.

With reference to the attached drawings, a cleaning turbine according to the present invention is indicated by the reference number 10 and in normal use is used in association with a work tool 11 and driven by drive members 12, for example a mandrel which makes it rotate.

The cleaning turbine 10 according to the present invention is axial-symmetrical in shape with respect to an axis of rotation Z around which it is made to rotate by drive members 12.

In accordance with FIG. 1, and due to the particular conformation described hereafter, the cleaning turbine 10 is made to rotate in a clockwise direction as indicated by the arrow F.

Obviously, if the tool rotates in an anti-clockwise direction, the cleaning turbine 10 will have a specular conformation.

The cleaning turbine 10 is provided with a base surface 13, facing toward the work zone during use, with an upper surface 14, opposite the base surface 13, and with a circumferential surface 15, interposed between the base surface 13 and the upper surface 14.

The cleaning turbine 10 is also provided circumferentially with a plurality of slits 16, angularly distanced from each other and made in through manner through the base surface 13 and the upper surface 14.

According to a possible embodiment, each slit 16 develops along a median axis X which is inclined with respect to the axis of rotation Z to generate streams of air in order to keep the work zone clean from work residues.

In a possible solution, the slits 16 are made inclined circumferentially. The circumferential inclination of the slits 16 allows to generate the suction of the work residues in the work zone.

Merely by way of example, the median axis X of each slit 16 is circumferentially inclined, with respect to the circumferential direction of the cleaning turbine 10, by a circumferential angle $\alpha$ comprised between 20° and 70°, preferably between 30° and 60°, even more preferably between 30° and 50°.

According to another solution, combinable with the embodiments described here, the slits 16 are inclined in a radial direction with respect to the axis of rotation Z diverging from the base surface 13 toward the upper surface 14. The radial inclination of the slits 16, combined with the centrifugal action conferred on the work residues sucked in, prevents the formation of blockages in the slits 16.

Merely by way of example, the median axis X of each slit 16 is radially inclined by a radial angle $\beta$ comprised between 10° and 50°, preferably between 20° and 40°, even more preferably between 30° and 35°.

According to a possible solution of the present invention, the slits 16 have a cross section, with respect to their median axis X, of uniform sizes along their longitudinal extension.

This solution allows to simplify the operations to make the cleaning turbine 10.

According to a variant embodiment, not shown, the slits 16 can have a cross section, with respect to their median axis X, which is divergent from the base surface 13 toward the upper surface 14.

According to the solution shown in the attached drawings, the slits 16 have a substantially rectangular cross section shape. This cross section shape allows to maximize the area of passage for the work residues through the turbine.

The slits 16 with rectangular cross section are also suitably rounded in correspondence with the edges, in order to reduce the dead zones where the streams of air stagnate, and to prevent blockages of the slits 16.

According to possible solutions, the slits have a section with sizes comprised between 400 mm$^2$ and 900 mm$^2$.

According to a possible embodiment of the present invention, the base surface 13 of the cleaning turbine 10 has a concave conformation recessed toward the upper surface 14.

Figure 4:
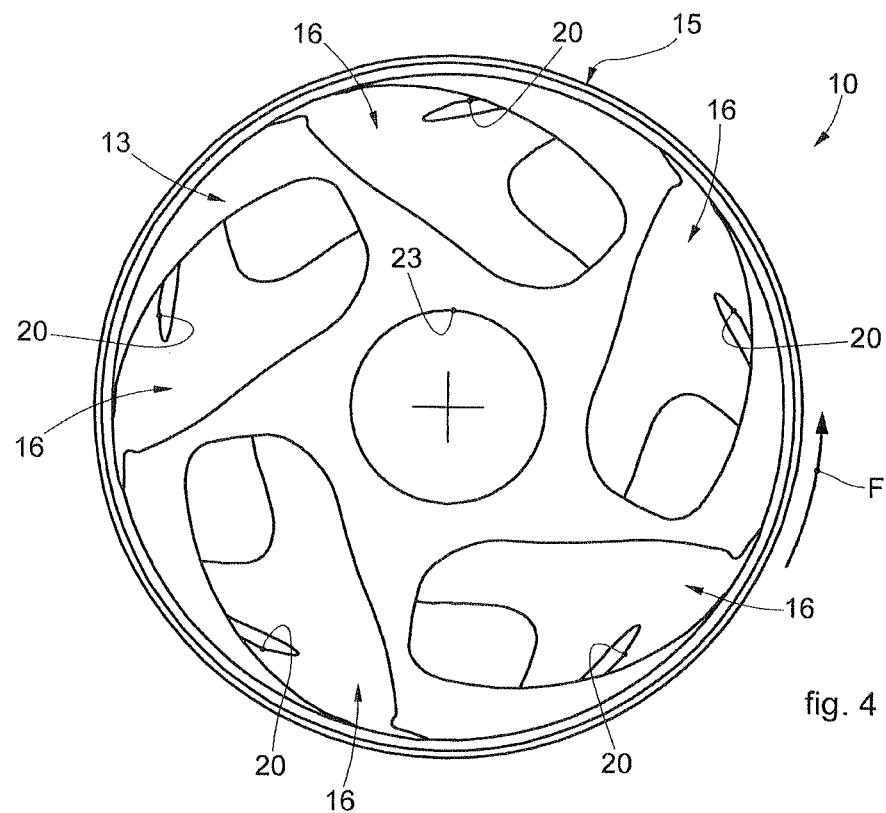
FIG. 4 is a plan view from below of FIG. 2.

This concave conformation causes an increase in the flow of air that can be sucked in through the slits 16 since, as can be seen from FIG. 4, it allows to increase the sizes of the entrance section of the air, and hence to optimize the suction streams.

Merely by way of example, it can be provided that the entrance section sizes of the work residues, evaluated on the base surface 13, are comprised between about 1.2 and about 1.8 times the size of the exit section of the work residues, evaluated on the upper surface 14.

The concave conformation also allows to generate a depression air bell which is very effective and able to suck in the work residues generated by the tool 11.

According to a possible solution of the invention, the base surface 13 has a leading edge 17, located in correspondence with the circumferential surface 15, which is inclined with respect to the horizontal, that is, to a plane orthogonal to the axis of rotation Z, by an angle of leading $\gamma$ (FIG. 5) comprised between 20° and 70°, preferably between 30° and 70°, even more preferably between 40° and 70°.

According to a possible embodiment the leading edge 17 is defined by a rounded portion 18 of the base surface 13 which can have a connection radius R comprised between 30 mm and 80 mm for a cleaning turbine 10 with a diameter comprised between 80 mm and 100 mm.

According to one feature of the present invention, the cleaning turbine 10 is also provided with a plurality of lateral apertures 20, each of which extends radially through from the circumferential surface 15 into one of the slits 16.

According to possible embodiments of the present invention, each slit 16 is provided with a respective lateral aperture 20.

According to possible variant embodiments, not shown, the slit 16 can be provided with two or more lateral apertures 20.

According to a possible solution, the lateral apertures 20 have sizes of the transit section, determined on a plane orthogonal to the median axis X, comprised between 0.1 and 0.5, preferably between 0.2 and 0.4 times the sizes of the cross section of the slits 16. This sizing of the lateral apertures 20 ensures an effective suction is generated of the work residues, preventing the cleaning turbine 10 from stalling.

According to other solutions, the lateral apertures 20 have a fissure conformation with a longitudinal development disposed along the circumferential development of the cleaning turbine 10. This elongated configuration allows the lateral aperture 20 to affect substantially the whole width of the wall of the slit 16 in which the lateral aperture 20 opens. In this way it is possible to ensure an effective discharge at least of the powders.

According to a possible solution, the lateral apertures 20 develop inclined with respect to a plane orthogonal to the axis of rotation Z by an angle of inclination $\phi$ with an amplitude comprised between 1° and 5°, preferably between 2° and 4°.

Figure 3:
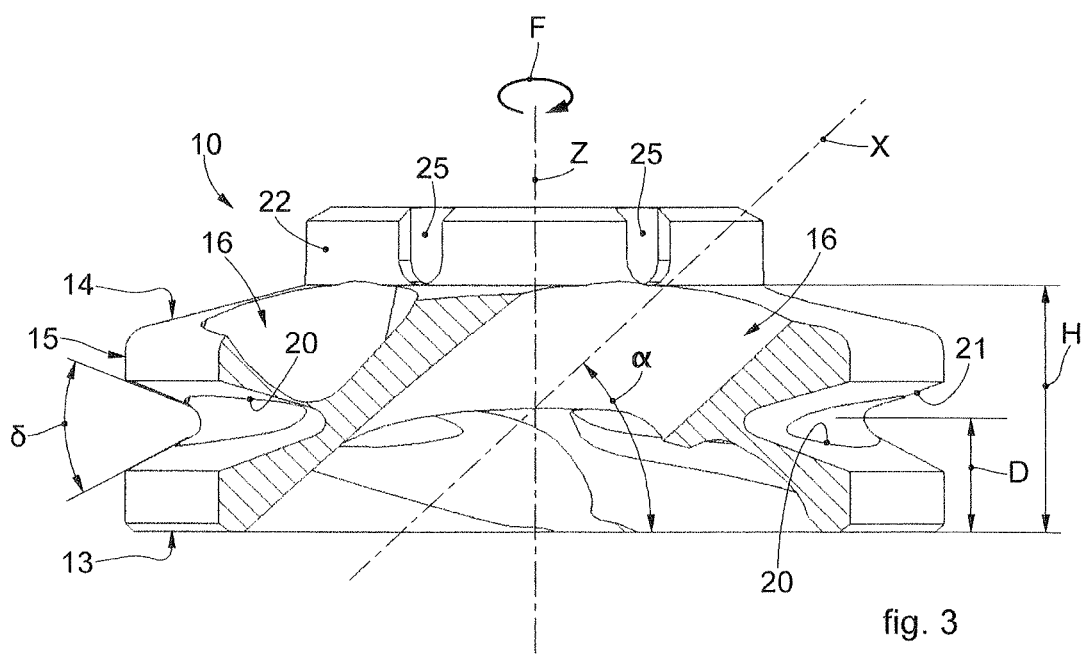
FIG. 3 is a section view along the section line of FIG. 2.

According to a solution shown in FIG. 3, the base surface 13 and the upper surface 14 are distanced from each other by a maximum height H which, merely by way of example, can be comprised between 20 mm and 35 mm.

The lateral apertures 20 are made in the circumferential surface 15 at a distance D from the base surface 13 which, merely by way of example, is comprised between 0.3 and 0.7, preferably between 0.4 and 0.6 times said height H. This position of the slits 16 ensures an effective suction action and prevents the onset of turbulent motions of the powders which, due to centrifugal action, are expelled through the lateral apertures 20. Furthermore, turbulent motions generate in the powders electrostatic charges which tend to make the powders adhere to the walls of the slits 16, causing a blockage of the cleaning turbine 10.

According to a possible solution, a circumferential throat 21 is made in the circumferential surface 15 of the cleaning turbine 10 and extends radially toward the slits 16 and defines in each of them a respective lateral aperture 20.

In particular, the circumferential throat 21 extends radially on a plane orthogonal to the axis of rotation Z, and the lateral apertures 20 are located in the circumferential throat 21.

The circumferential throat 21 can be made at said height H described above.

According to a possible solution, the circumferential throat 21 has a V-shaped cross section with an angle of aperture 6 comprised between 20° and 60°, preferably between 30° and 50°.

According to variant embodiments, not shown, it can be provided that each lateral aperture 20 is obtained by making a through cavity, for example an eyelet or a hole, independent from the other lateral apertures 20.

According to a possible solution, the upper surface 14 has an arched shape, with the convexity accentuated toward the axis of rotation Z. This characteristic, combined with the concave conformation of the base surface 13, allows to obtain a substantially uniform thickness of the cleaning turbine 10, that is, the walls of each slit 16 substantially have the same development in height. This allows to generate homogeneous suction streams and the problems of stalling are limited.

The cleaning turbine 10 according to the present invention is provided with a connection portion 22 located centrally and in which the work tool 11 is connected.

The connection portion 22 is provided with a central hole 23 in which, during use, the work tool 11 is positioned coaxially.

The central hole 23 can be provided with connection elements, for example threaded portions 24, provided to allow to connect the cleaning turbine 10 with a mandrel of the drive members 12 or with the work tool 11.

The threaded portions 24 allow to supply the cleaning turbine 10 with a ring-nut function to clamp the tools to the mandrel of the drive members. In this case, the cleaning turbine 10 can be screwed directly onto the mandrel and have a closing function, for example to close an elastic cone to hold the tool 11.

According to variant embodiments, the cleaning turbine 10 according to the present invention can be attached to a traditional tool-carrier, for example with a conical attachment.

In this way a cleaning turbine 10 is obtained which can be adopted on any type of tool and/or tool-carrier.

Gripping elements can also be made in the connection portion 22, for example hollows 25 to allow to grip the cleaning turbine 10 with a handling tool.

Figure 5:
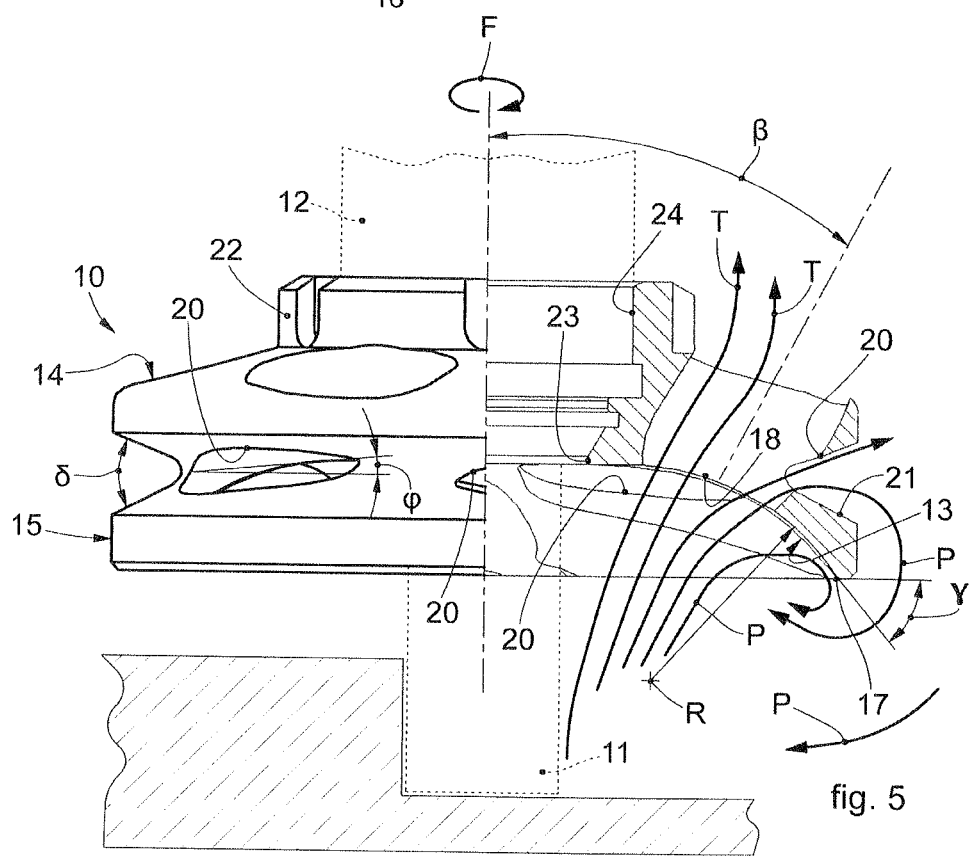
FIG. 5 is a section view along the line V-V of FIG. 2, of a cleaning turbine associated with a work machine.

With reference to FIG. 5, we will now describe the functioning of the cleaning turbine 10 according to the present invention.

Once associated with the work tool 11, the cleaning turbine 10 is made to rotate around its axis of rotation Z by the drive members 12.

Thanks to the particular conformation of the slits 16, the rotation of the cleaning turbine 10 generates a depression which extends from the base surface 13 to the work zone of the tool 11.

The suction of the chip through the slits 16 is indicated in FIG. 5 by arrows T, while the suction of the powders is indicated by arrows P.

As can be seen, the chip is sucked in and made to transit through the slits 16 in through manner, while the powders P, once introduced through the slits 16, at least partly exit through the lateral apertures 20, to be sucked in by suction devices, not shown.

A portion of the powders P, which have not received enough kinetic energy to be distanced from the work zone, can be recirculated, by the action of the depression generated, inside the depression bell defined inside the cleaning turbine 10.

In this way it is possible to ensure an optimum cleaning of the work zone where the work tool 11 is working.

It is clear that modifications and/or additions of parts may be made to the cleaning turbine 10 as described heretofore, without departing from the field and scope of the present invention.

It is also clear that, although the present invention has been described with reference to some specific examples, a person of skill in the art shall certainly be able to achieve many other equivalent forms of cleaning turbine 10, having the characteristics as set forth in the claims and hence all coming within the field of protection defined thereby.

I claim:

1. A cleaning turbine having a cylindrical shape with an axis of rotation and provided with a concave base surface facing toward a work zone, with an upper surface, opposite the base surface, and a circumferential surface interposed between the base surface and the upper surface, said cleaning turbine being provided circumferentially with a plurality of slits angularly distanced from each other, facing upward and passing through said base surface and said upper surface, wherein said cleaning turbine is also provided with a plurality of lateral apertures each of which extends radially from said slits to said circumferential surface and wherein a circumferential throat is made in said circumferential surface and extends radially on a plane orthogonal to said axis of rotation, said lateral apertures being located in said circumferential throat.

2. The turbine as in claim 1, wherein said lateral apertures each have a transit section size that is between 0.1 and 0.5 times a size of a cross section of each of said slits.

3. The turbine as in claim 2, wherein the transit section is between 0.2 and 0.4 times the sizes of the cross section of the slits.

4. The turbine as in claim 1, wherein said lateral apertures are made in said circumferential surface at a distance from said base surface that is between 0.3 and 0.7 times a height of said cleaning turbine defined between said base surface and said upper surface.

5. The turbine as in claim 4, wherein the distance from said base surface is between 0.4 and 0.6 the height of said cleaning turbine.

6. The turbine as in claim 1, wherein said circumferential throat has a V-shaped cross section with an angle of aperture that is between 20° and 60°.

7. The turbine as in claim 6, wherein the angle of aperture is between 30° and 50°.

8. The turbine as in claim 1, wherein said lateral apertures have a fissure conformation with a longitudinal development disposed along a circumferential development of said cleaning turbine.

9. The turbine as in claim 8, wherein said lateral apertures develop inclined with respect to a plane orthogonal to said axis of rotation by an angle of inclination with an amplitude that is between 1° and 5°.

10. The turbine as in claim 9, wherein the angle of inclination has an amplitude of between 2° and 4°.

11. The turbine as in claim 1, wherein each slit develops along a median axis inclined with respect to the axis of rotation, and in that said slits are made circumferentially inclined.

12. The turbine as in claim 11, wherein said median axis of each slit is circumferentially inclined by a circumferential angle that is between 20° and 70°.

13. The turbine as in claim 12, wherein the circumferential angle is between 300 and 60°.

14. The turbine as in claim 13, wherein the circumferential angle is between 300 and 50°.

15. The turbine as in claim 1, wherein each slit develops along a median axis inclined with respect to the axis of rotation, and in that said slits are inclined in a radial direction with respect to the axis of rotation diverging from said base surface toward said upper surface.

16. The turbine as in claim 7, wherein said median axis of each slit is radially inclined by a radial angle that is between 10° and 50°.

17. The turbine as in claim 16, wherein the radial angle is between 20° and 40°.

18. The turbine as in claim 17, wherein the radial angle is between 250 and 350.

19. The turbine as in claim 1, wherein said slits have a cross section, with respect to their median axis, of uniform sizes along their longitudinal extension.

20. The turbine as in claim 1, wherein said base surface has a leading edge, located in correspondence with said circumferential surface, that is inclined with respect to a plane orthogonal to said axis of rotation, by an angle of leading that is between 200 and 70°.

21. The turbine as in claim 20, wherein the angle of leading is between 30° and 70°.

22. The turbine as in claim 21, wherein the angle of leading is between 40° and 70°.

23. The turbine as in claim 1, wherein said slits have a rectangular conformation with rounded edges and with a cross sectional area from 400 mm² to 900 mm².

* * * * *